US009788328B2

(12) United States Patent
Tavildar et al.

(10) Patent No.: US 9,788,328 B2
(45) Date of Patent: Oct. 10, 2017

(54) JOINT SCHEDULING OF DEVICE-TO-DEVICE (D2D) LINKS AND WIDE AREA NETWORK (WAN) UPLINK (UL) USER EQUIPMENTS (UES)

(71) Applicant: QUALCOMM Incorporated, San Diego, CA (US)

(72) Inventors: Saurabha Rangrao Tavildar, Jersey City, NJ (US); Junyi Li, Chester, NJ (US); Bilal Sadiq, Somerville, NJ (US); Qing He, Cambridge, MA (US)

(73) Assignee: QUALCOMM Incorporated, San Diego, CA (US)

( * ) Notice: Subject to any disclaimer, the term of this patent is extended or adjusted under 35 U.S.C. 154(b) by 477 days.

(21) Appl. No.: 13/767,757

(22) Filed: Feb. 14, 2013

(65) Prior Publication Data

US 2014/0226504 A1 Aug. 14, 2014

(51) Int. Cl.
*H04W 72/08* (2009.01)
*H04W 36/20* (2009.01)
(Continued)

(52) U.S. Cl.
CPC ......... *H04W 72/082* (2013.01); *H04W 36/20* (2013.01); *H04W 72/1226* (2013.01);
(Continued)

(58) Field of Classification Search
CPC ..... H04W 36/20; H04W 36/24; H04W 36/30; H04W 36/36; H04W 72/082;
(Continued)

(56) References Cited

U.S. PATENT DOCUMENTS 7,903,605 B2 3/2011 Cheng et al.
2010/0093364 A1 4/2010 Ribeiro et al.
(Continued)

FOREIGN PATENT DOCUMENTS

CN 102638893 A 8/2012
WO 2007059448 5/2007
(Continued)

OTHER PUBLICATIONS

Peng, et al., "Interference avoidance mechanisms in the hybrid cellular and device-to-device systems", IEEE 20th International Symposium on Personal, Indoor and Mobile Radio Communications (PIMRC 2009), IEEE, Piscataway, NJ, USA, Sep. 13, 2009 (Sep. 13, 2009), pp. 617-621, XP031659660.
(Continued)

*Primary Examiner* — Joshua Kading
(74) *Attorney, Agent, or Firm* — Arent Fox, LLP

(57) ABSTRACT

A method, an apparatus, and a computer program product for wireless communication are provided. The apparatus of a device-to-device (D2D) link receives from a base station an indication of an acceptable level of interference that the base station can tolerate on an uplink resource. The uplink resource is allocated to a user equipment (UE) for a wide area network (WAN) transmission. The acceptable level of interference is a level of interference that the base station can tolerate on the uplink resource while the base station receives the WAN transmission from the UE. The apparatus determines a level of interference to the UE's transmission at the base station and performs a D2D communication on the uplink resource allocated to the second UE for the WAN transmission if the determined level of interference is less than the acceptable level.

20 Claims, 14 Drawing Sheets

(51) Int. Cl.
| | |
|---|---|
| *H04W 16/14* | (2009.01) |
| *H04W 72/12* | (2009.01) |
| *H04W 36/24* | (2009.01) |
| *H04W 36/36* | (2009.01) |
| *H04W 72/04* | (2009.01) |

(52) U.S. Cl.
CPC ............ *H04W 16/14* (2013.01); *H04W 36/24* (2013.01); *H04W 36/36* (2013.01); *H04W 72/042* (2013.01); *H04W 72/1215* (2013.01); *H04W 72/1289* (2013.01)

(58) Field of Classification Search
CPC ........... H04W 72/085; H04W 72/1226; H04W 72/1215; H04W 72/1289; H04W 72/042; H04W 16/14
See application file for complete search history.

(56) References Cited

U.S. PATENT DOCUMENTS

| | | | |
|---|---|---|---|
| 2011/0151887 A1* | 6/2011 | Hakola et al. ............. | 455/452.2 |
| 2011/0243010 A1 | 10/2011 | Geirhofer et al. | |
| 2011/0306349 A1* | 12/2011 | Hakola ................. | H04W 28/04 455/450 |
| 2012/0087347 A1 | 4/2012 | Patil et al. | |
| 2012/0243431 A1 | 9/2012 | Chen et al. | |
| 2013/0012221 A1* | 1/2013 | Zou et al. .................. | 455/452.1 |
| 2014/0141789 A1* | 5/2014 | Tarokh .................. | H04W 72/02 455/450 |

FOREIGN PATENT DOCUMENTS

| | | |
|---|---|---|
| WO | 2009009548 A2 | 1/2009 |
| WO | 2010125427 A1 | 11/2010 |

OTHER PUBLICATIONS

International Search Report and Written Opinion—PCT/US2014/015061—ISA/EPO—dated Jul. 22, 2014.

Lee H, et al., "Opportunistic band sharing for point-to-point link connection of cognitive radio",Cognitive Radio Oriented Wireless Networks and Communications, 2009. CROWNCOM '09, 4th International Conference on, IEEE, Piscataway, NJ, USA, Jun. 22, 2009 (Jun. 22, 2009), XP031499192, ISBN : 978-1-4244-3423-7, pp. 1-6.

Partial International Search Report—PCT/US2014/015061—ISA/EPO—dated May 28, 2014.

Wang D. et al., "An Interference Coordination Scheme for Device-to-Device Multicast in Cellular Networks" , Vehicular Technology Conference (VTC Fall), 2012 IEEE, IEEE, Sep. 3, 2012 (Sep. 3, 2012), pp. 1-5, XP032294520, DOI : 10. 1109/VTCFALL.2012. 6398945, ISBN: 978-1-4673-1880-8.

* cited by examiner

JOINT SCHEDULING OF DEVICE-TO-DEVICE (D2D) LINKS AND WIDE AREA NETWORK (WAN) UPLINK (UL) USER EQUIPMENTS (UES)

BACKGROUND

Field

The present disclosure relates generally to communication systems, and more particularly, to jointly scheduling device-to-device links and wide area network uplink user equipments.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. In an aspect, an apparatus receives from a base station an indication of an acceptable level of interference that the base station can tolerate on an uplink resource. The uplink resource is allocated to a user equipment (UE) for a wide area network (WAN) transmission. The acceptable level of interference is a level of interference that the base station can tolerate on the uplink resource while the base station receives the WAN transmission from the UE. The apparatus determines a level of interference to the UE's transmission at the base station and performs a device-to-device (D2D) communication on the uplink resource allocated to the second UE for the WAN transmission if the determined level of interference is less than the acceptable level.

In another aspect, an apparatus measures a signal strength of a UE transmitting on an uplink resource, determines an acceptable level of interference that the base station can tolerate on the uplink resource based on the measured signal strength, and transmits the acceptable level of interference to at least one UE interested in conducting D2D communication on the uplink resource.

In a further aspect, an apparatus determines an interference caused by a D2D link scheduled on an uplink resource, selects a UE for communicating with the apparatus on the uplink resource, determines a transmission power for the selected UE based on the determined interference, and instructs the selected UE to transmit on the uplink resource at the determined transmission power.

DETAILED DESCRIPTION

Figure 1:
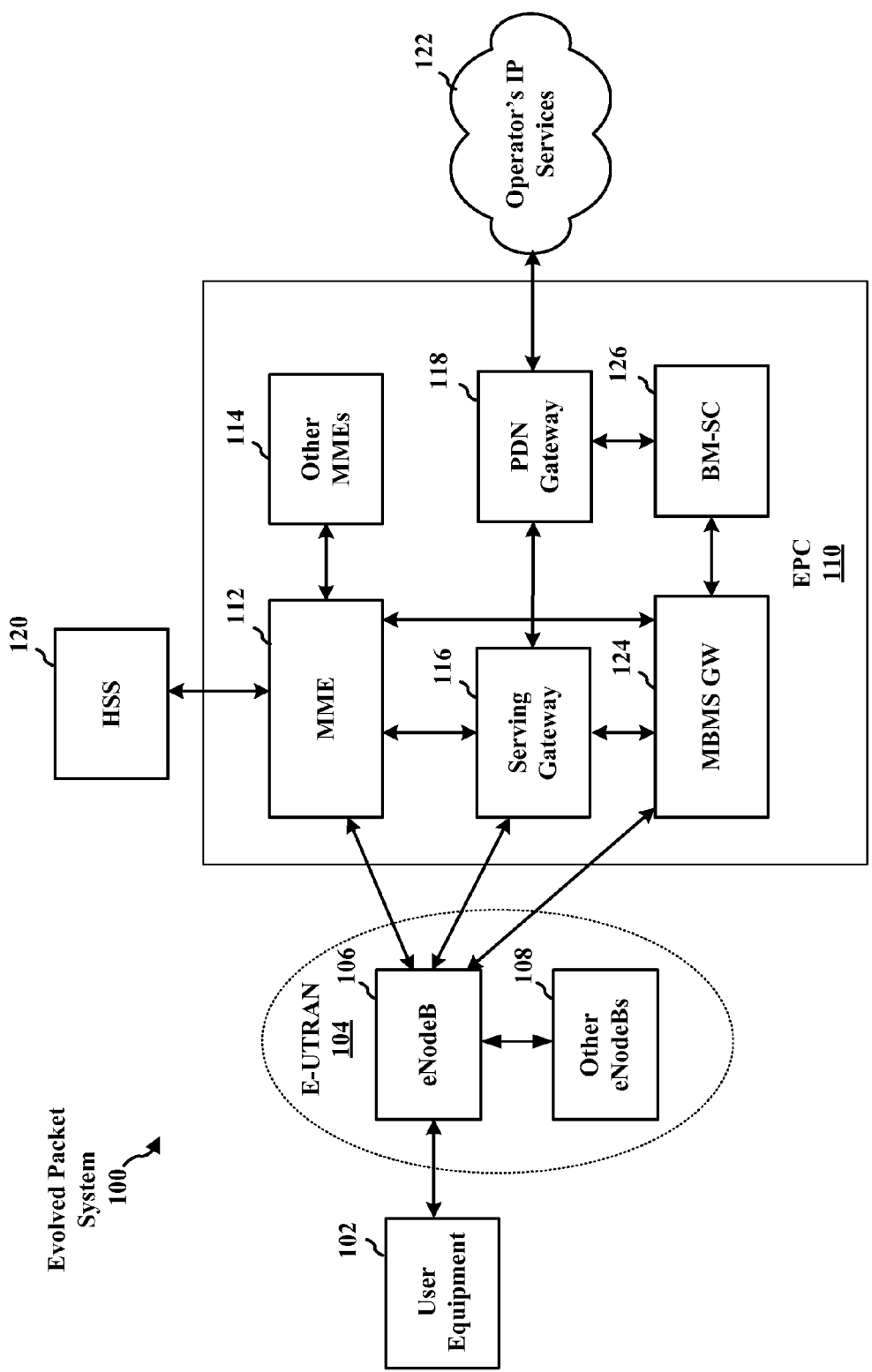
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 is the source of MBMS traffic. The MBMS Gateway 124 distributes the MBMS traffic to the eNBs 106, 108.

Figure 2:
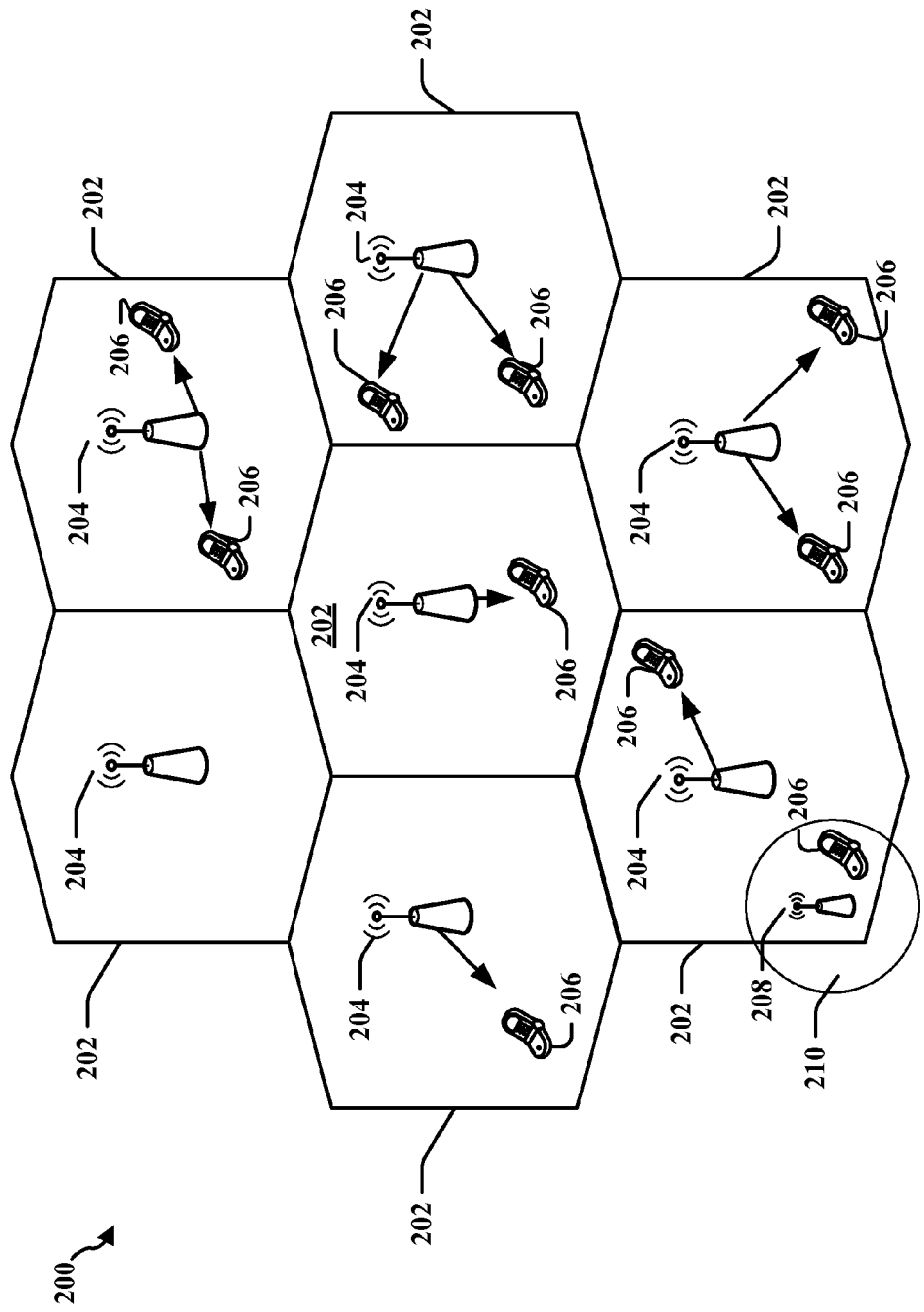
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2

(3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
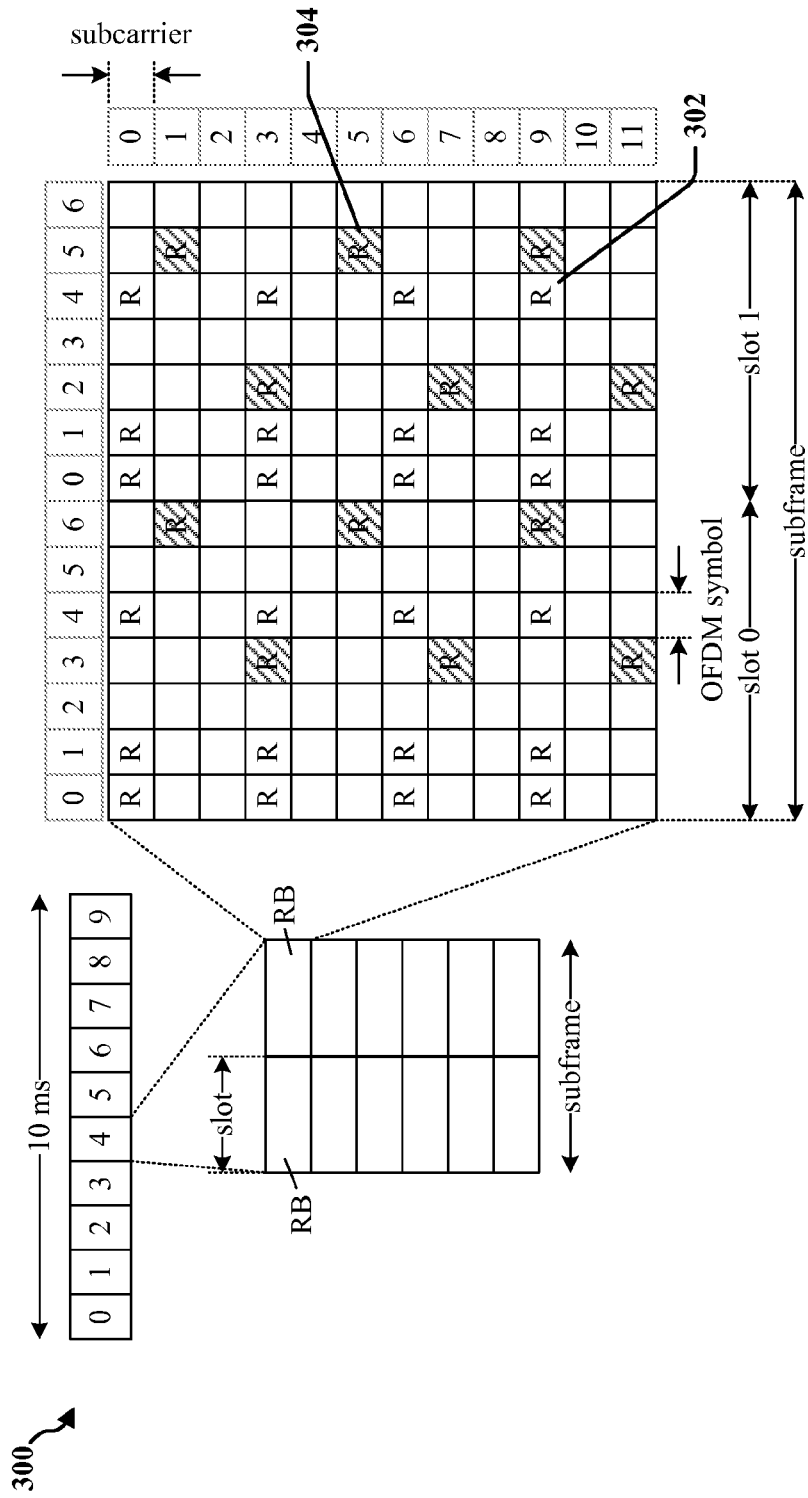
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
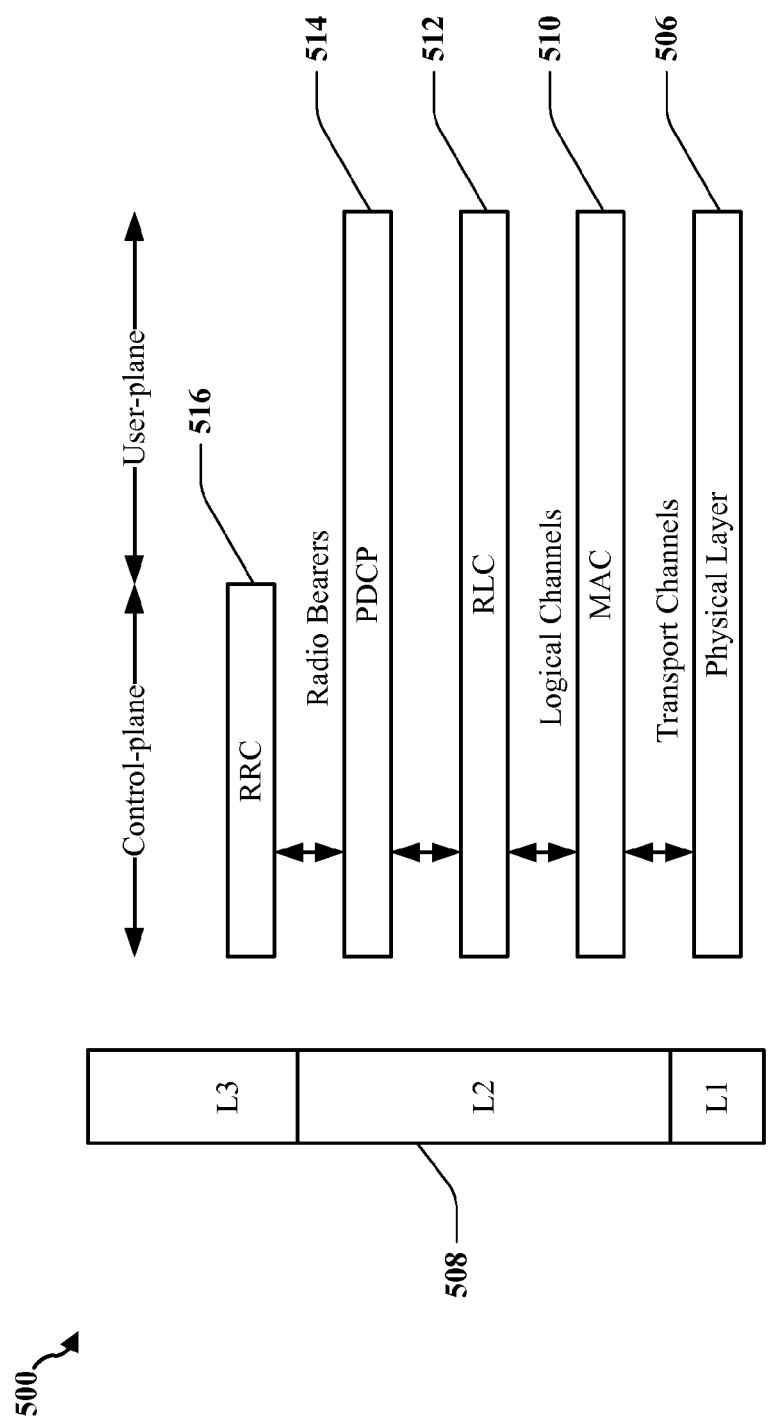
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
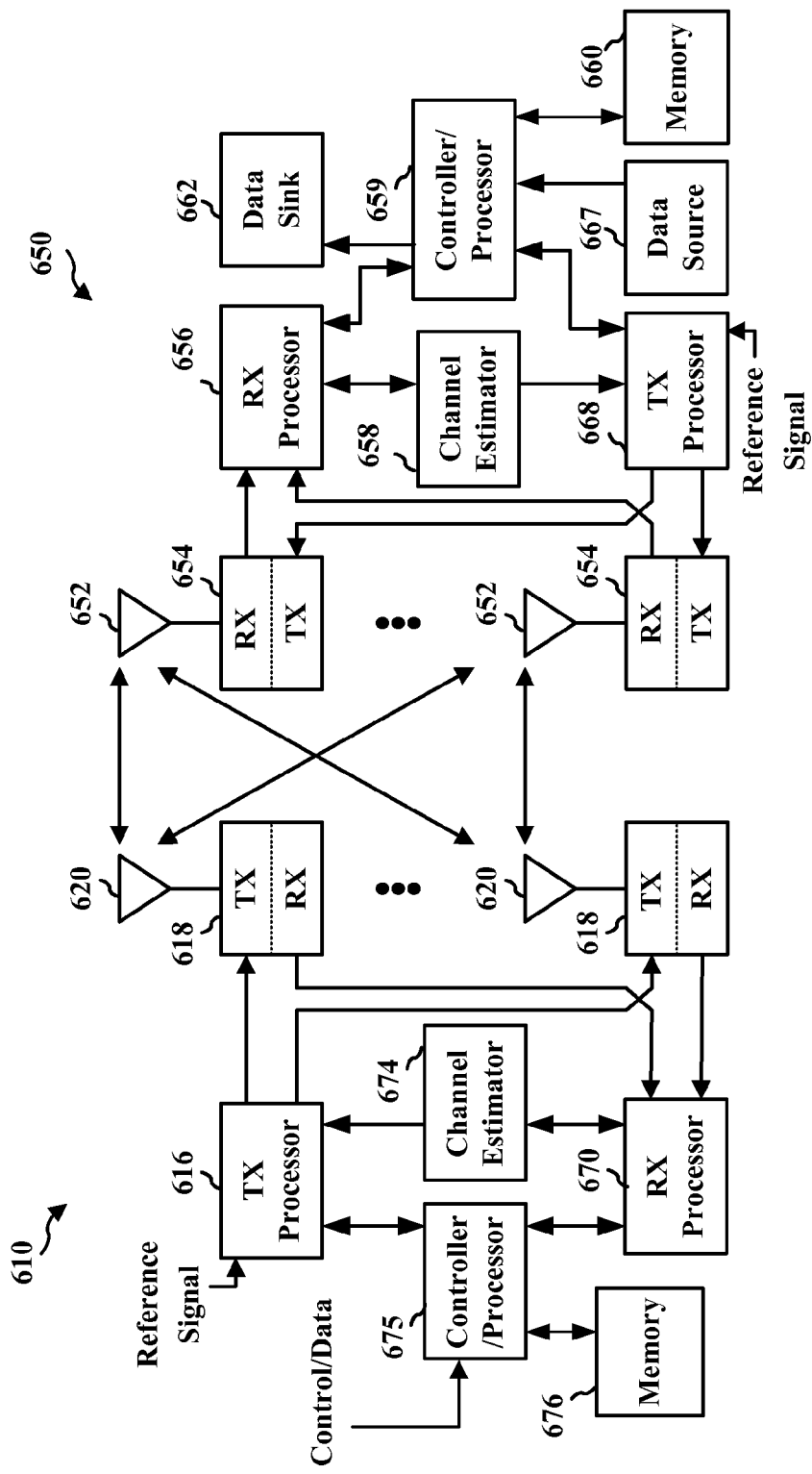
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
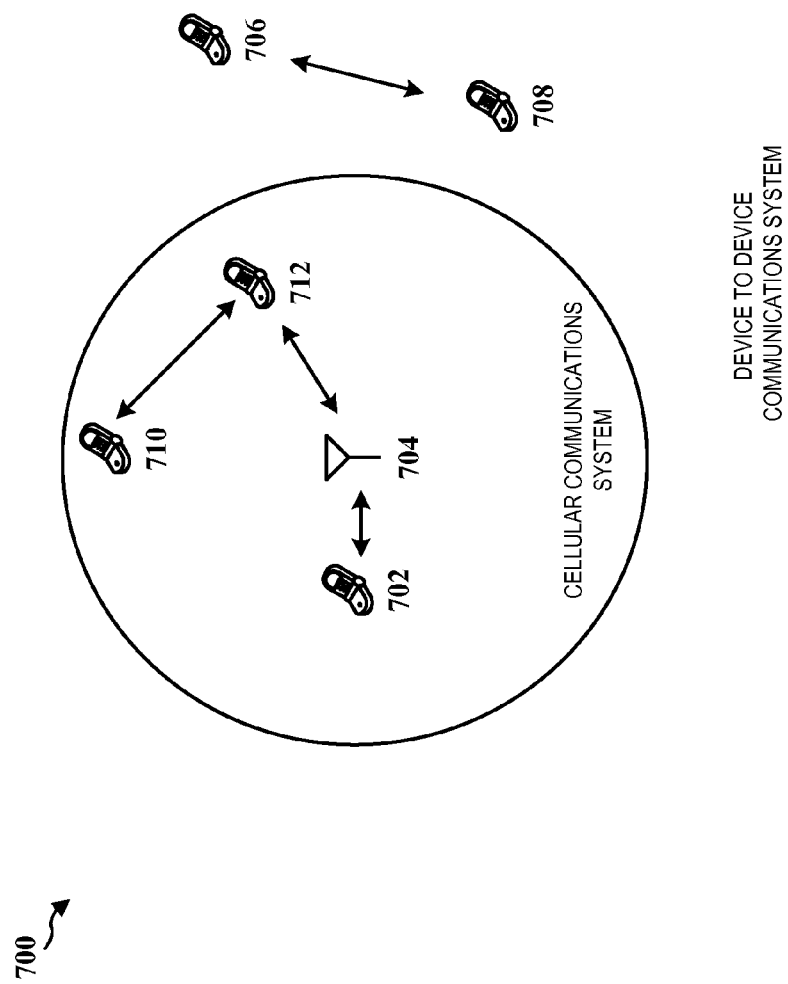
FIG. 7 is a diagram of an exemplary device-to-device (D2D) communications system according to one embodiment.

FIG. 7 is a diagram 700 of an exemplary device-to-device (D2D) communications system. The device-to-device communications system includes a plurality of wireless devices 706, 708, 710, 712. The device-to-device communications system may overlap with a cellular communications system, such as for example, a wireless wide area network (WWAN) (e.g., access network 200). The cellular communications system includes wireless device 702 communicating with base station 704 in an established wide area network link. Some of the wireless devices 706, 708, 710, 712 may communicate together in device-to-device communication, some may communicate with the base station 704, and some may do both. Device-to-device communication may be effectuated by directly transferring signals between the wireless devices. Thus, the signals need not traverse through an access node (e.g., a base station) or centrally managed network. Device-to-device communication may provide short range, high data rate communication (e.g., within a home or office type setting). As shown in FIG. 7, the wireless devices 706, 708 are in device-to-device communication in an established device-to-device link. The wireless devices 710, 712 are also in device-to-device communication in an established device-to-device link. The wireless device 712 also communicates with the base station 704 in an established wide area network link.

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. One of ordinary skill in the art would understand that the exemplary methods and apparatuses are applicable more generally to a variety of other wireless device-to-device communication systems.

The present disclosure relates to device-to-device (D2D) communication in a long term evolution (LTE) communication system. In an aspect, joint scheduling of D2D links and wide area network (WAN) uplink user equipments (UEs) is provided. Traditionally, certain subframes of a resource space may be allocated for D2D traffic while other subframes of the resource space are allocated for uplink WAN communication. Here, spatial reuse across uplink UEs and D2D links is provided. In an aspect, uplink UE transmissions are first scheduled on an uplink resource. Thereafter, D2D link transmissions are scheduled on the uplink resource while ensuring that the D2D link transmissions do not interfere with the uplink UE transmissions, and that the uplink UE transmissions do not interfere with the D2D link transmissions. The solution provided by the present disclosure is beneficial in that whether a given uplink resource or subframe is used depends on the characteristics of the UE intending to use the uplink resource for communication. For example, a UE near a base station can use the uplink resource for uplink WAN communication while a D2D link at a cell edge can use the same uplink resource for D2D communication.

According to the present disclosure, D2D link transmissions and WAN link transmissions are scheduled on an uplink spectrum. Particularly, the transmissions of the D2D links and the WAN links are scheduled on the same subframe via spatial reuse. This may be accomplished by independently scheduling the transmissions of WAN UEs and D2D links while managing the interference between such entities. The aspects of the present disclosure may apply to D2D links in general. However, the aspects may particularly benefit a D2D link that is a relay access link.

According to one aspect, a WAN uplink UE transmission is first scheduled on an uplink resource. Thereafter, transmissions of D2D links that do not interfere with the WAN uplink UE transmission are scheduled on the same uplink resource. For example, a certain D2D link transmission may only be scheduled on an uplink resource on which a WAN uplink transmission from a UE near a cell center is scheduled.

According to an aspect, the following operations/steps may be performed. A base station (e.g., eNodeB) may schedule a WAN UE uplink transmission on an uplink resource. The base station may also determine an expected power level at which the WAN UE uplink transmission will be received by the base station or a pathloss of the WAN UE uplink transmission. Based on the expected power or pathloss, the base station may determine a tolerable interference level from D2D UEs (e.g., 20 dB below the expected power at which the WAN UE uplink transmission will be received). The base station broadcasts (e.g., on a physical downlink control channel (PDCCH)) an uplink schedule regarding the uplink resource along with a maximum tolerable interference allowed on the uplink resource. A D2D link that causes interference below the maximum tolerable interference may transmit D2D traffic on the uplink resource.

A UE of a D2D link may receive the broadcasted information on PDCCH and assess whether to schedule a D2D link transmission on the uplink resource. The UE may decide to schedule the D2D link transmission if a determined level of interference to the WAN UE uplink transmission is below the maximum tolerable interference value broadcasted by the base station. The determined level of interference may depend on a D2D link pathloss to the base station. The UE of the D2D link may also determine an interference the UE will receive due to the WAN UE uplink transmission, and decide to yield the uplink resource to the WAN UE uplink transmission if the determined interference is above an acceptable level.

The UE of the D2D link schedules a D2D link transmission amongst UEs that did not yield to the base station. That is, the UE of the D2D link must contend with other UEs that have decided to use the same uplink resource. Accordingly, the UE of the D2D link schedules a D2D link transmission on the uplink resource if the UE does not yield the uplink resource to the base station or to any other UE.

According to the solution described above, WAN uplink traffic is assumed to have higher priority than D2D link traffic, and is therefore scheduled first on an uplink resource. However, in other embodiments, D2D links may be treated as having higher priority over the base station (e.g., on certain subframes). Accordingly, D2D link transmissions may be scheduled first on an uplink resource. Thereafter, WAN UE uplink transmissions that do not get interfered with, nor interfere with D2D link transmissions, may be scheduled on the uplink resource.

Figure 8:
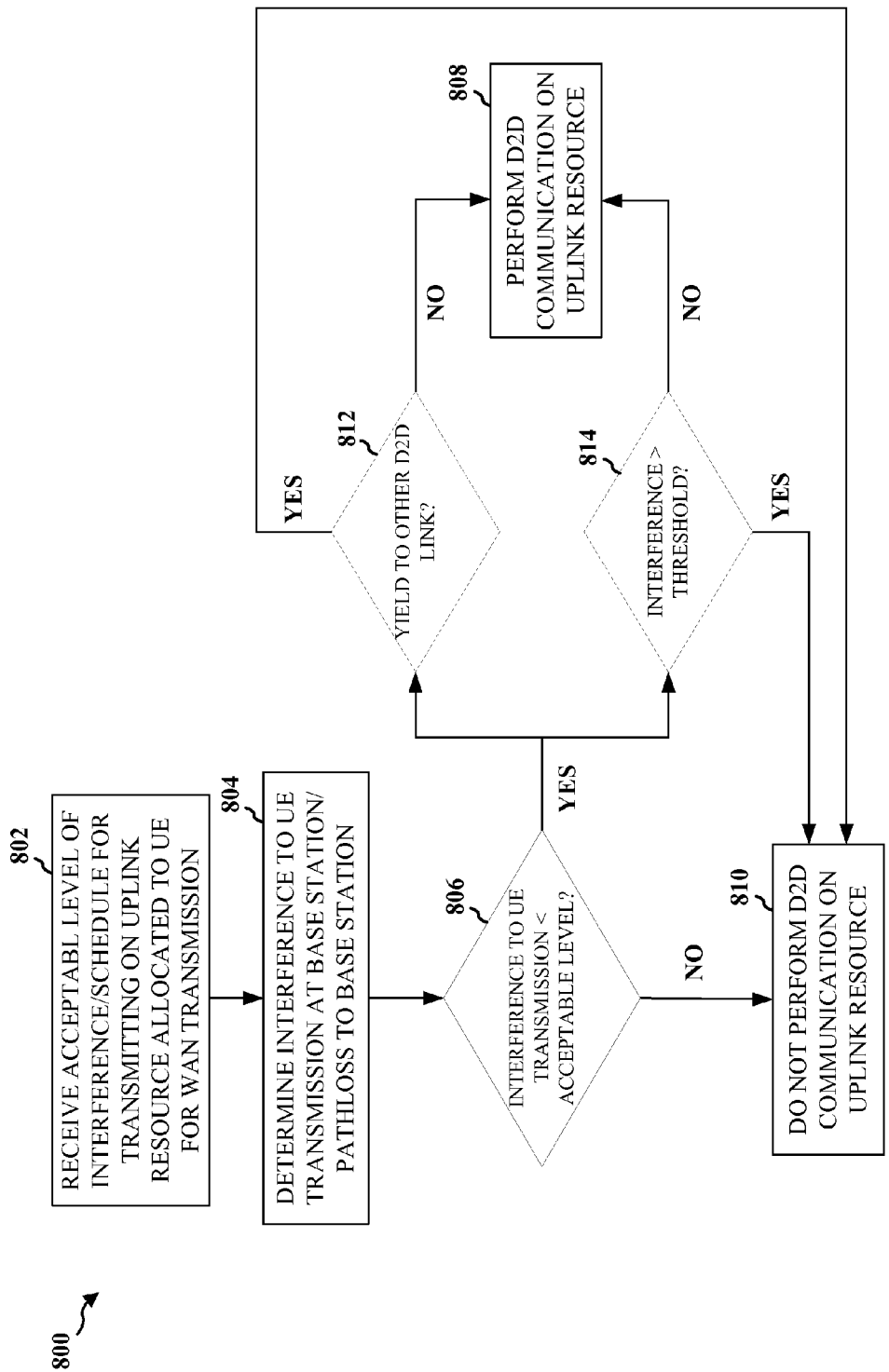
FIG. 8 is a flow chart of a method of wireless communication.

FIG. 8 is a flow chart 800 of a method of wireless communication. The method may be performed by a UE of a D2D link (e.g., UE 712 of FIG. 7). The UE may be interested in conducting (D2D) communication on an uplink resource.

At step 802, the UE (e.g., UE 712) receives from a base station (e.g., base station 704 of FIG. 7) an indication of an acceptable level of interference that the base station can tolerate on an uplink resource. The uplink resource may be allocated to another UE (e.g., UE 702 of FIG. 7) for a wide area network (WAN) transmission. The acceptable level of interference (e.g., expressed in dBm) that the base station can tolerate on the uplink resource may be a level of interference that the base station can tolerate while the base station receives the WAN transmission from the other UE (e.g., UE 702). Further, at step 802, the UE (e.g., UE 712) may receive from the base station a schedule for transmitting on the uplink resource. The schedule may include the indication of the acceptable level of interference that the base station can tolerate on the uplink resource. The UE (e.g., UE 712) may receive the schedule and the acceptable level of interference via a physical downlink control channel (PDCCH).

At step 804, the UE determines a level of interference to the other UE's (e.g., UE 702) transmission as received by the base station. In an aspect, the UE (e.g., UE 712) may determine a pathloss between the UE and the base station, wherein the level of interference to the other UE's (e.g., UE 702) transmission as received by the base station is determined based on the determined pathloss. The pathloss between the UE and the base station may be the attenuation (e.g., expressed in dB) experienced by signals transmitted by the UE and received by the base station. The level of interference to the other UE's transmission may be the power level (e.g., expressed in dBm) of a signal transmitted by the UE (e.g., UE 712) as measured by the base station.

At step 806, the UE (e.g., UE 712) determines whether the level of interference is less than the acceptable level. Based on a positive outcome at step 806, the UE (e.g. UE 712) proceeds to perform a D2D communication on the uplink resource allocated to the other UE (e.g., UE 702) for the WAN transmission (step 808). Alternatively, when the level of interference to the other UE's transmission at the base station is greater than the acceptable level, the UE decides not to perform the D2D communication (step 810).

Optionally, at step 812, the UE may determine whether to yield to at least one other D2D link (e.g., a D2D link used by UE 706 and UE 708) also determined to communicate on the uplink resource. Based on a negative outcome at step 812, the UE proceeds to perform the D2D communication on the uplink resource allocated to the other UE for the WAN transmission (step 808). Otherwise, the UE decides not to perform the D2D communication (step 810).

In a further option, at step 814, the UE (e.g., UE 712) may measure a level of interference to the D2D link due to the other UE (e.g., UE 702) transmitting on the uplink resource, and determine whether the level of interference to the D2D link is greater than a threshold. Based on a negative outcome at step 814, the UE (e.g., UE 712) proceeds to perform the D2D communication on the uplink resource allocated to the other UE (e.g., UE 702) for the WAN transmission (step 808). Otherwise, the UE decides not to perform the D2D communication (step 810).

Figure 9:
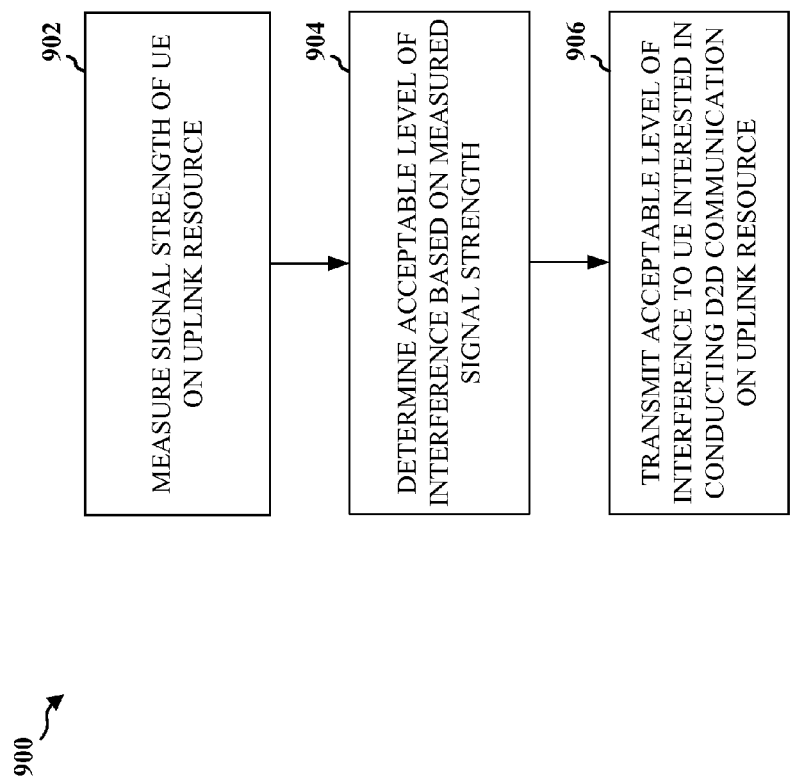
FIG. 9 is a flow chart of a method of wireless communication.

FIG. 9 is a flow chart 900 of a method of wireless communication. The method may be performed by a base station (e.g., base station 704 of FIG. 7).

At step 902, the base station measures a signal strength of a UE (e.g., UE 702 of FIG. 7) transmitting on an uplink resource. At step 904, the base station determines an acceptable level of interference that the base station can tolerate on the uplink resource based on the measured signal strength. The acceptable level of interference may be an acceptable level of interference that the base station can tolerate while the base station receives a WAN transmission from the UE (e.g., UE 702) on the uplink resource. In an aspect, the acceptable level of interference is determined by determining an average power level of the UE based on the measured signal strength and setting the acceptable level to a predetermined number of dB (e.g., 20 dB) less than the average power level of the UE. In another aspect, the acceptable level of interference is determined by determining a lowest measured power level of the UE based on the measured signal strength and setting the acceptable level to a predetermined number of dB (e.g., 20 dB) less than the lowest measured power level of the UE.

At step 906, the base station transmits the acceptable level of interference to at least one UE (e.g., UE 712 of FIG. 7) interested in conducting D2D communication on the uplink resource. The acceptable level of interference may be transmitted along with a schedule for transmitting on the uplink resource. Moreover, the acceptable level of interference may be transmitted via a physical downlink control channel (PDCCH).

Figure 10:
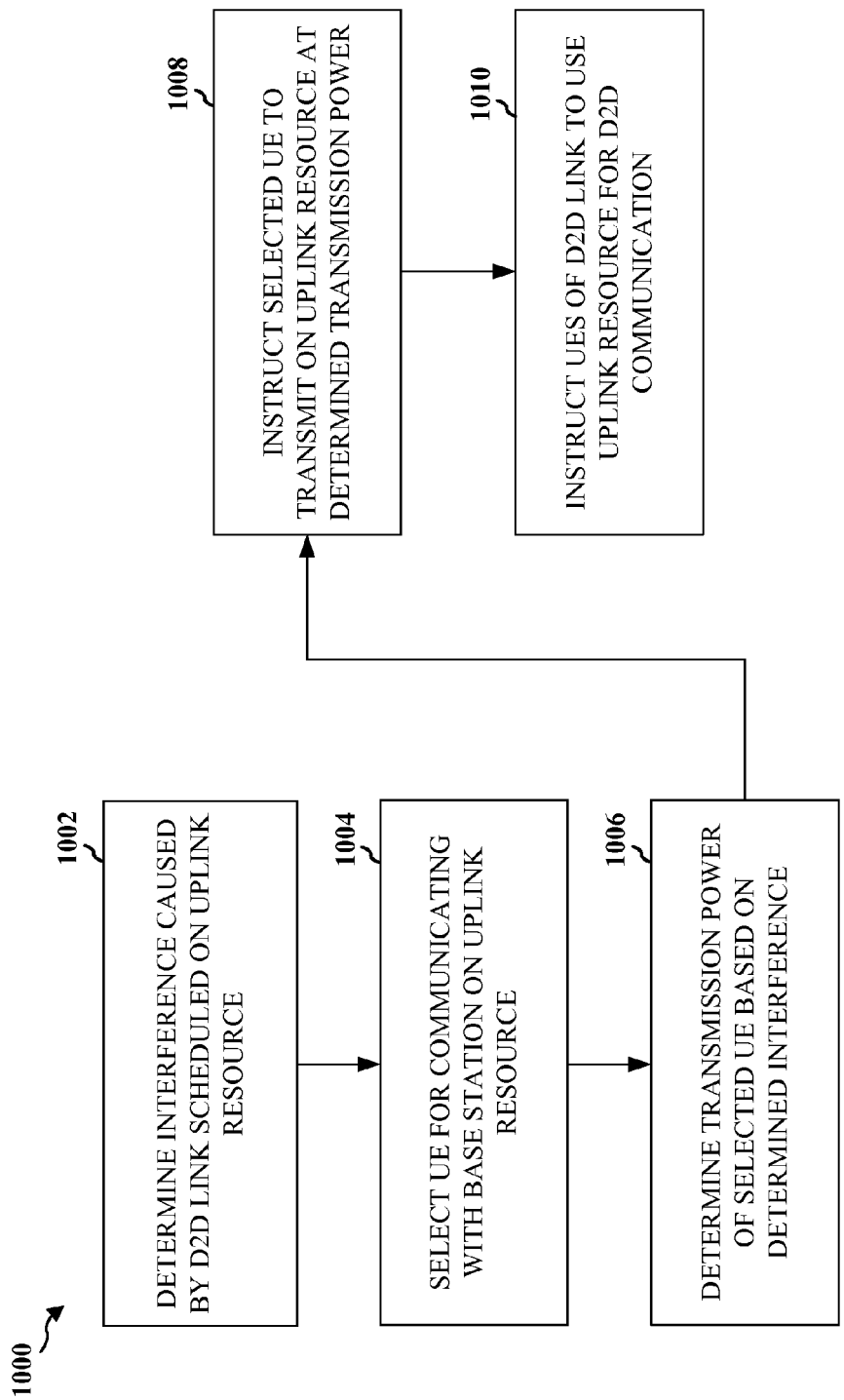
FIG. 10 is a flow chart of a method of wireless communication.

FIG. 10 is a flow chart 1000 of a method of wireless communication. The method may be performed by a base station (e.g., base station 704 of FIG. 7). At step 1002, the base station determines an interference caused by a D2D link (e.g., D2D link between UE 710 and UE 712 in FIG. 7) scheduled on an uplink resource. The D2D link may be scheduled on the uplink resource by the UEs (e.g., UEs 710 and 712) participating in the D2D link.

At step 1004, the base station selects a UE (e.g., UE 702 of FIG. 7) for communicating with the base station on the uplink resource (e.g., for a WAN communication). The UE may be selected based on a pathloss between the UE and the base station. For example, the UE may be selected based on a low pathloss between the UE and the base station that tolerates the interference caused by the D2D link on the uplink resource.

At step 1006, the base station determines a transmission power for the selected UE based on the determined interference. The determined transmission power allows the base station to receive an uplink transmission from the UE while the D2D link causes interference on the uplink resource.

At step 1008, the base station instructs the selected UE to transmit on the uplink resource at the determined transmission power. Thereafter, at step 1010, the base station may instruct the UEs of the D2D link to use the uplink resource for D2D communication.

Figure 11:
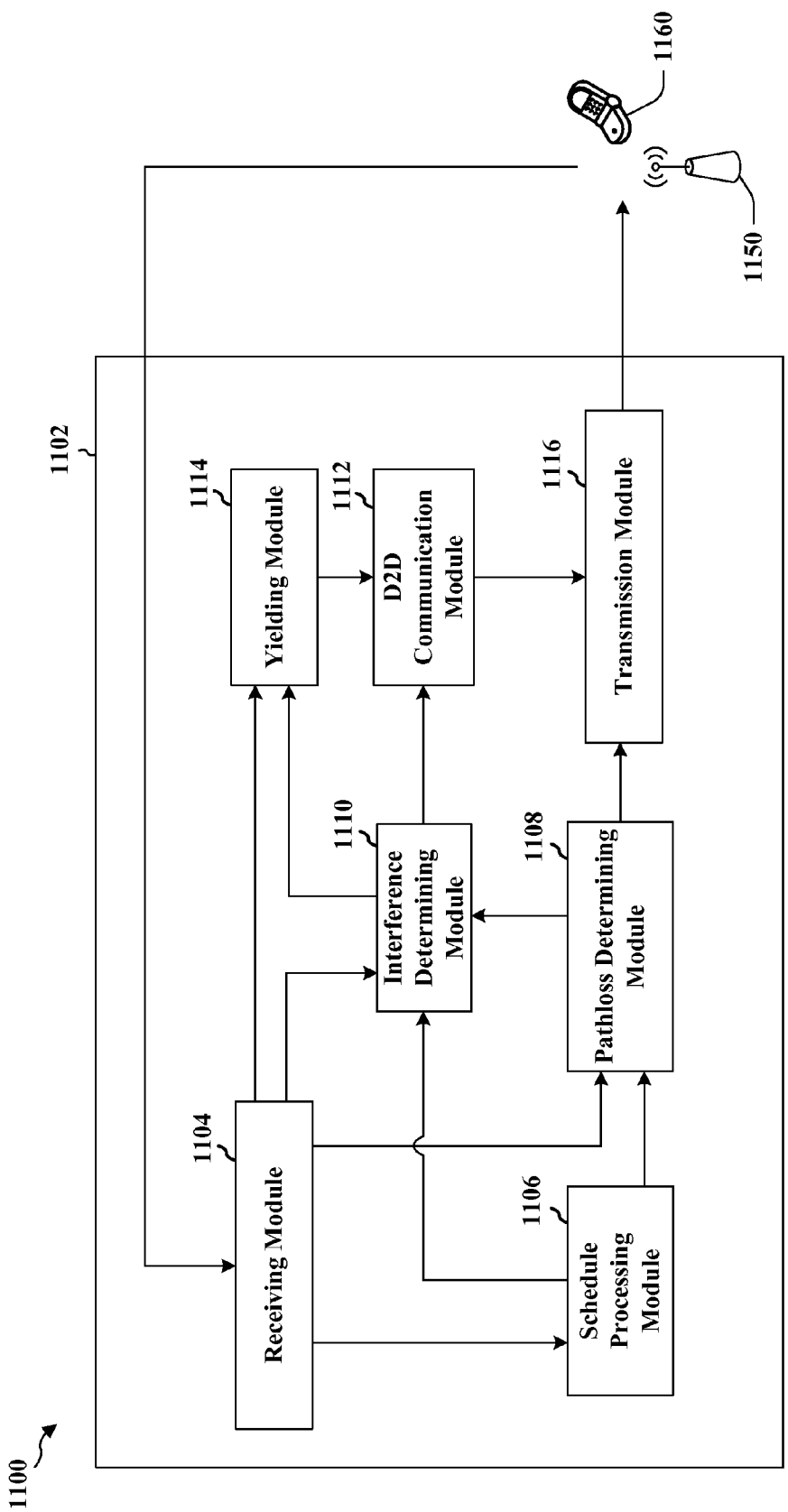
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus may be a UE of a D2D link (e.g., UE 712 of FIG. 7). The apparatus 1102 may be interested in conducting D2D communication on an uplink resource. The apparatus includes a receiving module 1104, a schedule processing module 1106, a pathloss determining module 1108, an interference determining module 1110, a D2D communication module 1112, a yielding module 1114, and a transmission module 1116.

The receiving module 1104 receives from a base station 1150 an indication of an acceptable level of interference that that base station 1150 can tolerate on an uplink resource. The uplink resource may be allocated to another UE (e.g., UE 1160) for a wide area network (WAN) transmission. The acceptable level of interference (e.g., expressed in dBm) that the base station 1150 can tolerate on the uplink resource may be a level of interference that the base station 1150 can tolerate while the base station 1150 receives the WAN transmission from the other UE (e.g., UE 1160). Further, the schedule processing module 1106 may receive from the base station 1150 (via the receiving module 1104) a schedule for transmitting on the uplink resource. The schedule may include the indication of the acceptable level of interference that the base station 1150 can tolerate on the uplink resource. The receiving module 1104 may receive the schedule and the acceptable level of interference via a physical downlink control channel (PDCCH).

The pathloss determining module 1108 determines a pathloss from the apparatus 1102 to the base station 1150. For example, the pathloss determining module 1108 may determine the pathloss by measuring an attenuation (e.g., in dB) experienced by signals transmitted by the apparatus 1102 and received by the base station 1150. The interference determining module 1110 determines a level of interference to the other UE 1160's transmission at the base station 1150 and whether the level of interference is less than the acceptable level. In an aspect, the interference determining module 1110 determines the level of interference by determining a power level (e.g., in dBm) of a signal transmitted by the apparatus 1102 as measured by the base station 1150. For example, the interference determining module 1110 may determine the level of interference based on the pathloss determined by the pathloss determining module 1108. When the level of interference to the other UE 1160's transmission at the base station 1150 is less than the acceptable level, the D2D communication module 1112 proceeds to perform a D2D communication (via transmission module 1116) on the uplink resource allocated to the other UE 1160 for the WAN transmission. Alternatively, when the level of interference to the other UE's transmission at the base station 1150 is greater than the acceptable level, the D2D communication module 1112 decides not to perform the D2D communication.

Optionally, the yielding module 1114 may determine whether to yield the uplink resource to at least one other D2D link also determined to communicate on the uplink resource. For example, the yielding module 1114 may determine an interference the apparatus 1102 will receive due to another D2D link communicating on the uplink resource, and decide to yield the uplink resource to the other D2D link communication if the determined interference is above an acceptable level. In another example, the yielding module 1114 may determine an interference the apparatus 1102 will cause to another D2D link communicating on the uplink resource, and decide to yield the uplink resource to the other D2D link communication if the apparatus 1102's interference is above an acceptable level. When the yielding module 1114 decides not to yield, the D2D communication module 1112 proceeds to perform the D2D communication (via transmission module 1116) on the uplink resource allocated to the other UE 1160 for the WAN transmission. Otherwise, the D2D communication module 1112 decides not to perform the D2D communication.

In a further option, the interference determining module 1110 may measure a level of interference to the D2D link due to the other UE 1160 transmitting on the uplink resource, and determine whether the level of interference to the D2D link is greater than a threshold. For example, the interference determining module 1110 may measure the level of interference by first determining a time at which the other UE 1160 performs a transmission. The interference determining module 1110 may then control the transmission module 1116 so that the apparatus 1102 does not transmit when the other UE 1160 performs the transmission to allow the interference determining module 1110 to measure the level of interference due to the other UE 1160's transmission. When the level of interference to the D2D link due to the other UE 1160's transmission is less than the threshold, the D2D communication module 1112 proceeds to perform the D2D communication (via transmission module 1116) on the uplink resource allocated to the other UE 1160 for the WAN transmission. Otherwise, the D2D communication module 1112 decides not to perform the D2D communication.

Figure 12:
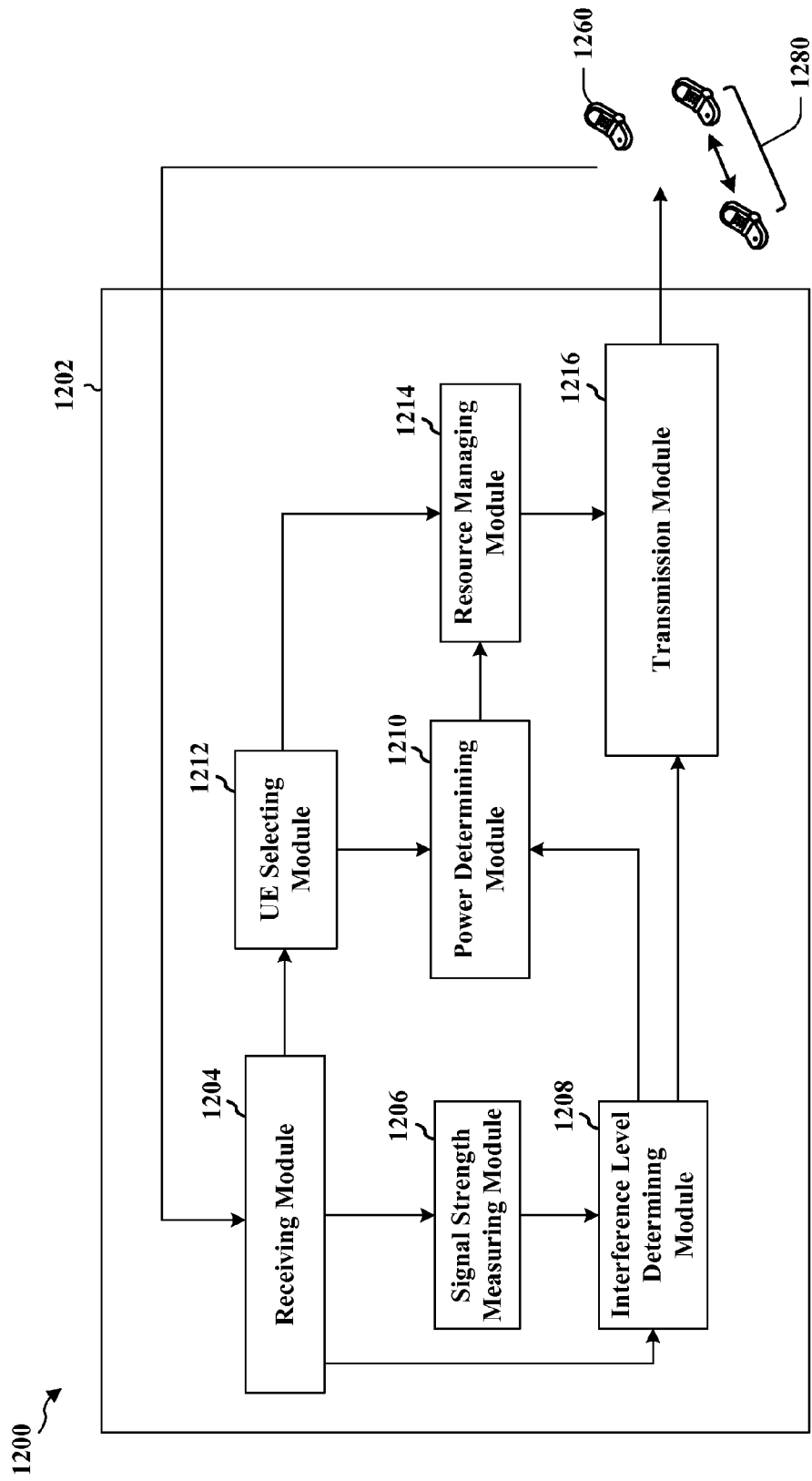
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a base station (e.g., base station 704 of FIG. 7). The apparatus includes a receiving module 1204, a signal strength measuring module 1206, an interference level determining module 1208, a power determining module 1210, UE selecting module 1212, a resource managing module 1214, and a transmission module 1216.

The signal strength measuring module 1206 measures (via receiving module 1204) a signal strength of a UE 1260 transmitting on an uplink resource, for example, during a time when the D2D link 1280 is inactive. The interference level determining module 1208 determines an acceptable level of interference that the apparatus 1202 can tolerate on the uplink resource based on the measured signal strength. The acceptable level of interference may be an acceptable level of interference that the apparatus 1202 can tolerate while the apparatus 1202 receives a WAN transmission from the UE 1260 on the uplink resource. In an aspect, the interference level determining module 1208 determines the acceptable level of interference by determining an average power level of the UE 1260 based on the measured signal strength and setting the acceptable level to a predetermined number of dB (e.g., 20 dB) less than the average power level of the UE 1260. In another aspect, the interference level determining module 1208 determines the acceptable level of interference by determining a lowest measured power level of the UE 1260 based on the measured signal strength and setting the acceptable level to a predetermined number of dB (e.g., 20 dB) less than the lowest measured power level of the UE 1260.

The interference level determining module 1208 transmits (via transmission module 1216) the acceptable level of interference to at least one UE (e.g., UEs of D2D link 1280) interested in conducting D2D communication on the uplink resource. The acceptable level of interference may be transmitted along with a schedule for transmitting on the uplink resource. Moreover, the acceptable level of interference may be transmitted via a physical downlink control channel (PDCCH).

In an aspect, the interference level determining module 1208 determines an interference caused by the D2D link 1280 scheduled on an uplink resource. For example, the interference level determining module 1208 may determine the interference by determining a power level (e.g., in dBm) of a signal scheduled to be transmitted by a UE participating in the D2D link 1280. The D2D link 1280 may be scheduled on the uplink resource by the UEs participating in the D2D link 1280. The UE selecting module 1212 selects a UE (e.g., UE 1260) for transmitting on the uplink resource (e.g., for a WAN communication). The UE 1260 may be selected based on a pathloss between the UE 1260 and the apparatus 1202. For example, the UE 1260 may be selected based on a low pathloss between the UE 1260 and the apparatus 1202 that tolerates the interference caused by the D2D link 1280 on the uplink resource.

The power determining module 1210 determines a transmission power for the selected UE 1260 based on the determined interference. For example, the power determining module 1210 may determine the transmission power for the selected UE 1260 by first calculating an average power level of signals received from the D2D link 1280. Thereafter, the power determining module 1210 may set the transmission power for the selected UE 1260 to be a predetermined number of dB above the calculated average power level of the signals received from the D2D link 1280. The determined transmission power allows the apparatus 1202 to receive an uplink transmission from the UE 1260 while the D2D link 1280 causes interference on the uplink resource. The resource managing module 1214 then instructs the selected UE 1260 (via transmission module 1216) to transmit on the uplink resource at the determined transmission power. Thereafter, the resource managing module 1214 may instruct UEs of the D2D link 1280 to use the uplink resource for D2D communication.

The apparatus may include additional modules that perform each of the steps of the algorithm in the aforementioned flow charts of FIGS. 8-10. As such, each step in the aforementioned flow charts of FIGS. 8-10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
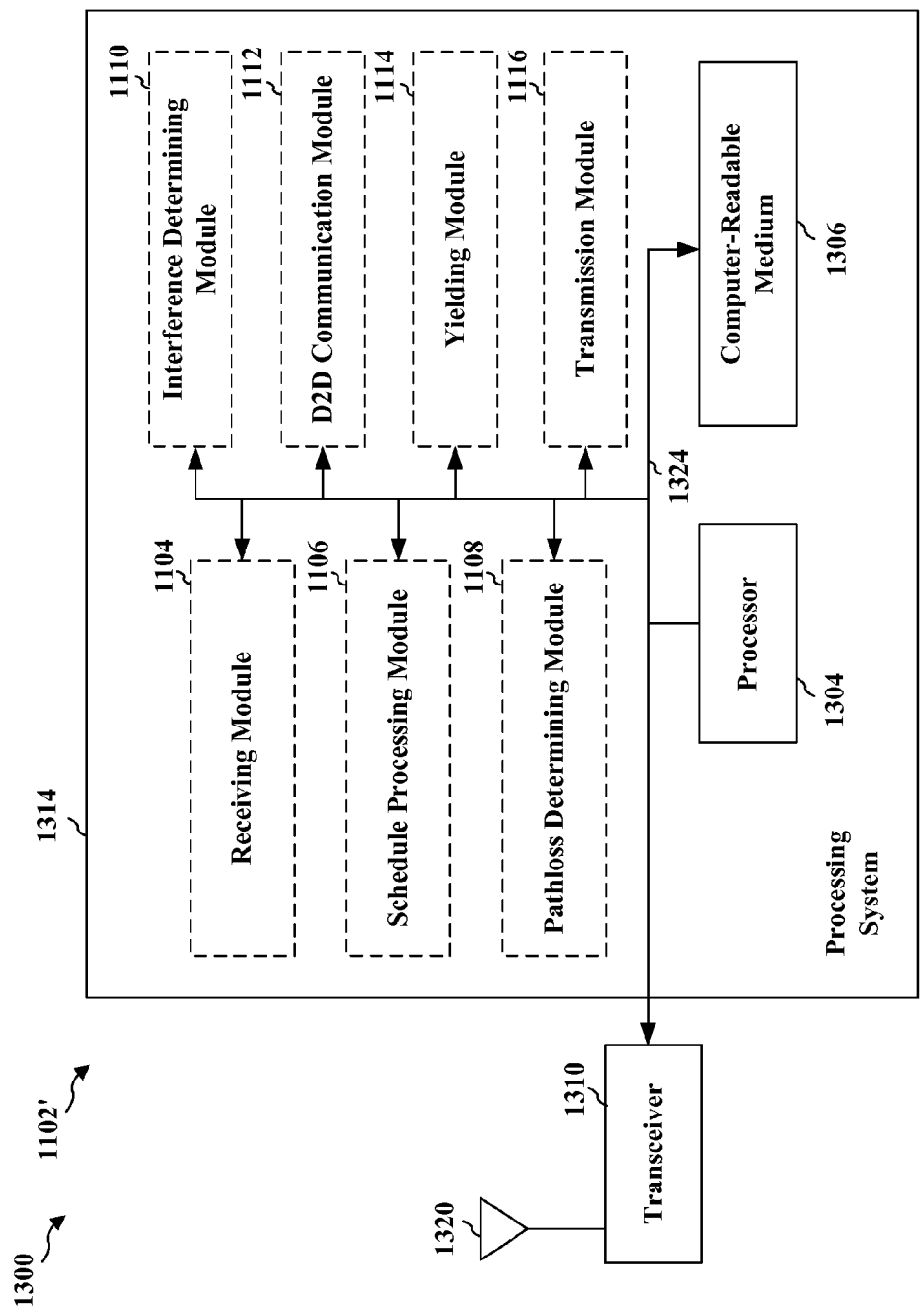
FIG. 13 is a diagram illustrating an example of a hardware implementation for an apparatus employing a processing system.

FIG. 13 is a diagram 1300 illustrating an example of a hardware implementation for an apparatus 1102' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1104, 1106, 1108, 1110, 1112, 1114, 1116, and the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the receiving module 1104. In addition, the transceiver 1310 receives information from the processing system 1314, specifically the transmission module 1116, and based on the received information, generates a signal to be applied to the one or more antennas 1320. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes at least one of the modules 1104, 1106, 1108, 1110, 1112, 1114, and 1116. The modules may be software modules running in the processor 1304, resident/stored in the computer readable medium 1306, one or more hardware modules coupled to the processor 1304, or some combination thereof. The processing system 1314 may be a component of the UE 650 and may include the memory 660 and/or at least one of the TX processor 668, the RX processor 656, and the controller/processor 659.

In one configuration, the apparatus 1102/1102' for wireless communication includes means for receiving from a base station an acceptable level of interference that the base station can tolerate on an uplink resource, the uplink resource allocated to a user equipment (UE) for a wide area network (WAN) transmission, the acceptable level of interference being a level of interference that the base station can tolerate on the uplink resource while the base station receives the WAN transmission from the UE, means for determining a level of interference to the UE's transmission at the base station, means for performing a D2D communication on the uplink resource allocated to the UE for the WAN transmission if the determined level of interference is less than the acceptable level, means for receiving from the base station a schedule for transmitting on the uplink resource, wherein the schedule includes the acceptable level of interference that the base station can tolerate on the uplink resource, means for determining a pathloss to the base station, wherein the level of interference to the UE's transmission at the base station is determined based on the determined pathloss, means for determining whether to yield to at least one other D2D link also determined to communicate on the uplink resource, means for communicating on the uplink resource for the D2D communication when the apparatus of the D2D link determines not to yield to the at least one other D2D link, means for determining a level of interference to the apparatus of the D2D link due to the UE transmitting on the uplink resource, means for determining not to communicate on the uplink resource for the D2D communication when the determined level of interference to the apparatus of the D2D link is greater than a threshold.

The aforementioned means may be one or more of the aforementioned modules of the apparatus 1102 and/or the processing system 1314 of the apparatus 1102' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 14:
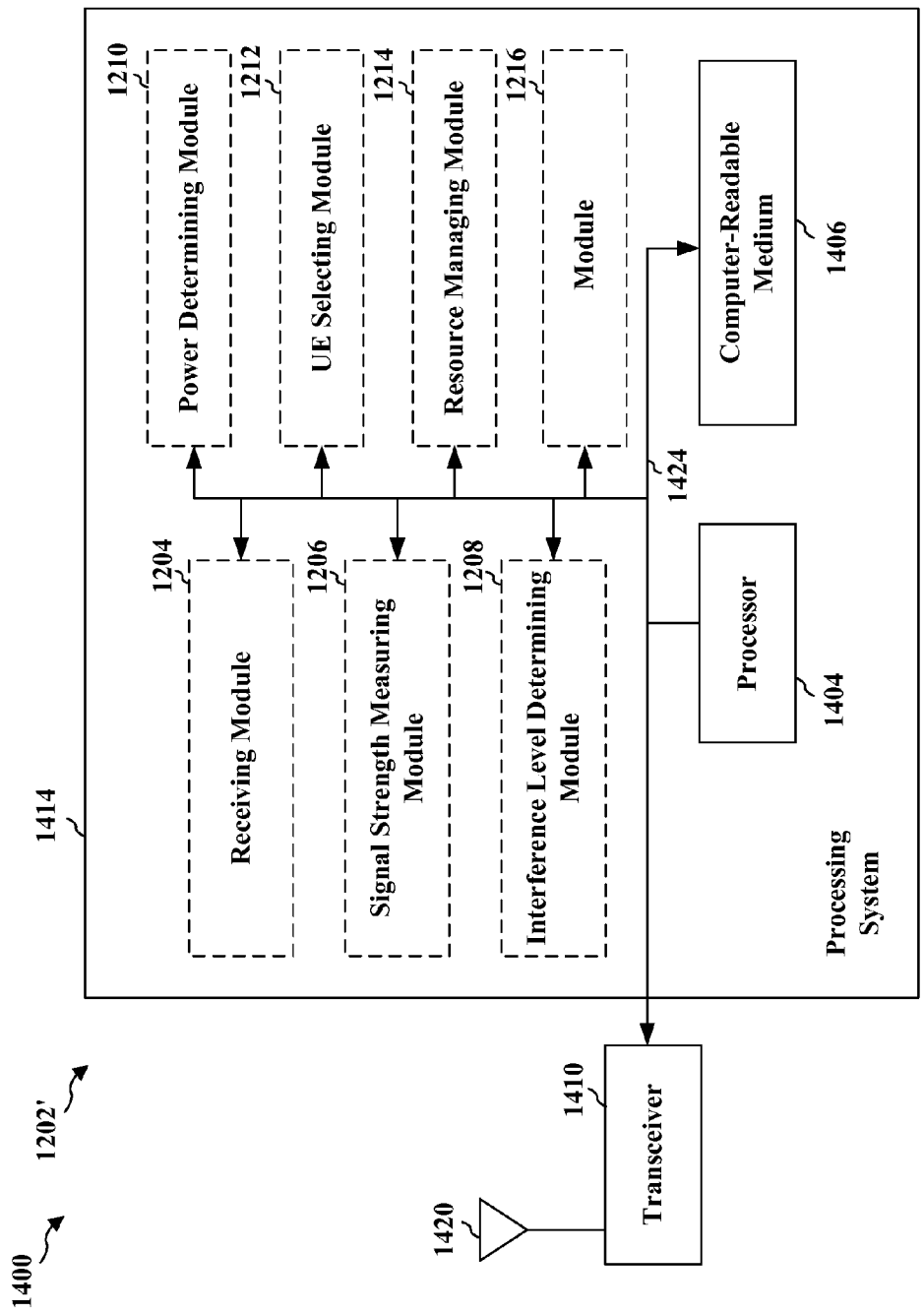
FIG. 14 is a diagram illustrating an example of a hardware implementation for an apparatus employing a processing system.

FIG. 14 is a diagram 1400 illustrating an example of a hardware implementation for an apparatus 1202' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1204, 1206, 1208, 1210, 1212, 1214, 1216, and the computer-readable medium 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the receiving module 1204. In addition, the transceiver 1410 receives information from the processing system 1414, specifically the transmission module 1216, and based on the received information, generates a signal to be applied to the one or more antennas 1420. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system further includes at least one of the modules 1204, 1206, 1208, 1210, 1212, 1214, and 1216. The modules may be software modules running in the processor 1404, resident/stored in the computer readable medium 1406, one or more hardware modules coupled to the processor 1404, or some combination thereof. The processing system 1414 may be a component of the eNB 610 and may include the memory 676 and/or at least one of the TX processor 616, the RX processor 670, and the controller/processor 675.

In one configuration, the apparatus 1202/1202' for wireless communication includes means for measuring a signal strength of a user equipment (UE) transmitting on an uplink resource, means for determining an acceptable level of interference that the base station can tolerate on the uplink resource based on the measured signal strength, means for transmitting the acceptable level of interference to at least one UE interested in conducting device-to-device (D2D) communication on the uplink resource, means for determining an interference caused by a device-to-device (D2D) link scheduled on an uplink resource, means for selecting a user equipment (UE) for communicating with the base station on the uplink resource, means for determining a transmission power for the selected UE based on the determined interference, means for instructing the selected UE to transmit on the uplink resource at the determined transmission power, and means for instructing UEs of the D2D link to use the uplink resource for D2D communication.

The aforementioned means may be one or more of the aforementioned modules of the apparatus 1202 and/or the processing system 1414 of the apparatus 1202' configured to perform the functions recited by the aforementioned means. As described supra, the processing system 1414 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a first user equipment (UE) of a device-to-device (D2D) link, comprising:
receiving from a base station an indication of an acceptable level of interference that the base station can tolerate on a time-frequency uplink resource, the time-frequency uplink resource allocated to a second UE for a wide area network (WAN) transmission, the acceptable level of interference being a level of interference that the base station can tolerate on the time-frequency uplink resource while the base station receives the WAN transmission from the second UE;
determining a level of interference to the second UE's transmission at the base station;
determining whether to yield to at least one other D2D link determined to communicate on the time-frequency uplink resource by determining an interference to the at least one other D2D link or by determining an interference from the at least one other D2D link; and
performing a D2D communication on the time-frequency uplink resource allocated to the second UE for the WAN transmission when the determined level of interference is less than the acceptable level and when the first UE determines not to yield to the at least one other D2D link based on the determined interference to the at least one other D2D link or the determined interference from the at least one other D2D link.

2. The method of claim 1, further comprising receiving from the base station a schedule for transmitting on the uplink resource, wherein the schedule includes the acceptable level of interference that the base station can tolerate on the time-frequency uplink resource.

3. The method of claim 2, wherein the schedule and the indication of the acceptable level of interference are received via a physical downlink control channel (PDCCH).

4. The method of claim 1, further comprising determining a pathloss to the base station, wherein the level of interference to the second UE's transmission at the base station is determined based on the determined pathloss.

5. The method of claim 1, further comprising:
determining a level of interference to the first UE of the D2D link due to the second UE transmitting on the uplink resource; and
determining not to communicate on the uplink resource for the D2D communication when the determined level of interference to the first UE of the D2D link is greater than a threshold.

6. An apparatus of a device-to-device (D2D) link, comprising:
means for receiving from a base station an indication of an acceptable level of interference that the base station can tolerate on a time-frequency uplink resource, the time-frequency uplink resource allocated to a user equipment (UE) for a wide area network (WAN) transmission, the acceptable level of interference being a level of interference that the base station can tolerate on the time-frequency uplink resource while the base station receives the WAN transmission from the UE;
means for determining a level of interference to the UE's transmission at the base station;
means for determining whether to yield to at least one other D2D link determined to communicate on the time-frequency uplink resource, the means for determining whether to yield being configured to determine an interference to the at least one other D2D link or to determine an interference from the at least one other D2D link; and
means for performing a D2D communication on the time-frequency uplink resource allocated to the UE for the WAN transmission when the determined level of interference is less than the acceptable level and when the apparatus determines not to yield to the at least one other D2D link based on the determined interference to the at least one other D2D link or the determined interference from the at least one other D2D link.

7. The apparatus of claim 6, further comprising means for receiving from the base station a schedule for transmitting on the time-frequency uplink resource, wherein the schedule includes the acceptable level of interference that the base station can tolerate on the time-frequency uplink resource.

8. The apparatus of claim 7, wherein the schedule and the indication of the acceptable level of interference are received via a physical downlink control channel (PDCCH).

9. The apparatus of claim 6, wherein the means for determining the level of interference is configured to determine a pathloss to the base station, wherein the level of interference to the UE's transmission at the base station is determined based on the determined pathloss.

10. The apparatus of claim 6, further comprising:
means for determining a level of interference to the apparatus of the D2D link due to the UE transmitting on the time-frequency uplink resource,
wherein the means for performing the D2D communication is configured to not communicate on the time-frequency uplink resource for the D2D communication when the determined level of interference to the apparatus of the D2D link is greater than a threshold.

11. An apparatus of a device-to-device (D2D) link, comprising:
a memory; and
at least one processor coupled to the memory and configured to:
receive from a base station an indication of an acceptable level of interference that the base station can tolerate on a time-frequency uplink resource, the time-frequency uplink resource allocated to a user equipment (UE) for a wide area network (WAN) transmission, the acceptable level of interference being a level of interference that the base station can tolerate on the time-frequency uplink resource while the base station receives the WAN transmission from the UE;
determine a level of interference to the UE's transmission at the base station;
determine whether to yield to at least one other D2D link determined to communicate on the time-frequency uplink resource by determining an interference to the at least one other D2D link or by determining an interference from the at least one other D2D link; and
perform a D2D communication on the time-frequency uplink resource allocated to the UE for the WAN transmission when the determined level of interference is less than the acceptable level and when the apparatus determines not to yield to the at least one other D2D link based on the determined interference to the at least one other D2D link or the determined interference from the at least one other D2D link.

12. The apparatus of claim 11, wherein the at least one processor is further configured to receive from the base station a schedule for transmitting on the time-frequency uplink resource, wherein the schedule includes the acceptable level of interference that the base station can tolerate on the time-frequency uplink resource.

13. The apparatus of claim 12, wherein the schedule and the indication of the acceptable level of interference are received via a physical downlink control channel (PDCCH).

14. The apparatus of claim 11, wherein the at least one processor is further configured to determine a pathloss to the base station, wherein the level of interference to the UE's transmission at the base station is determined based on the determined pathloss.

15. The apparatus of claim 11, wherein the at least one processor is further configured to:
determine a level of interference to the apparatus of the D2D link due to the UE transmitting on the time-frequency uplink resource; and
to not communicate on the time-frequency uplink resource for the D2D communication when the determined level of interference to the apparatus of the D2D link is greater than a threshold.

16. A non-transitory computer-readable medium being associated with a first user equipment (UE) of a device-to-device (D2D) link and storing computer executable code for wireless communication, comprising code for:
receiving from a base station an indication of an acceptable level of interference that the base station can tolerate on a time-frequency uplink resource, the time-frequency uplink resource allocated to a second UE for a wide area network (WAN) transmission, the acceptable level of interference being a level of interference that the base station can tolerate on the time-frequency uplink resource while the base station receives the WAN transmission from the second UE;
determining a level of interference to the second UE's transmission at the base station;

determining whether to yield to at least one other D2D link determined to communicate on the time-frequency uplink resource, the code for determining whether to yield further comprising code for determining an interference to the at least one other D2D link or for determining an interference from the at least one other D2D link; and performing a D2D communication on the time-frequency uplink resource allocated to the second UE for the WAN transmission when the determined level of interference is less than the acceptable level and when the first UE determines not to yield to the at least one other D2D link based on the determined interference to the at least one other D2D link or the determined interference from the at least one other D2D link.

17. The non-transitory computer-readable medium of claim 16, further comprising code for receiving from the base station a schedule for transmitting on the time-frequency uplink resource, wherein the schedule includes the acceptable level of interference that the base station can tolerate on the time-frequency uplink resource.

18. The non-transitory computer-readable medium of claim 17, further comprising code for determining a pathloss to the base station, wherein the level of interference to the second UE's transmission at the base station is determined based on the determined pathloss.

19. The non-transitory computer-readable medium of claim 16, further comprising code for:

determining a level of interference to the first UE of the D2D link due to the second UE transmitting on the time-frequency uplink resource; and determining not to communicate on the time-frequency uplink resource for the D2D communication when the determined level of interference to the first UE of the D2D link is greater than a threshold.

20. The non-transitory computer-readable medium of claim 17, wherein the schedule and the indication of the acceptable level of interference are received via a physical downlink control channel (PDCCH).

* * * * *